(12) United States Patent
Ishii et al.

(10) Patent No.: US 7,218,813 B2
(45) Date of Patent: May 15, 2007

(54) OPTICAL COMMUNICATION SYSTEM

(75) Inventors: Yorishige Ishii, Yamatotakada (JP); Tetsuo Iwaki, Yamatokooriyama (JP); Toshihiro Tamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 260 days.

(21) Appl. No.: 10/525,437

(22) PCT Filed: Aug. 21, 2003

(86) PCT No.: PCT/JP03/10543

§ 371 (c)(1),
(2), (4) Date: Feb. 22, 2005

(87) PCT Pub. No.: WO2004/019099

PCT Pub. Date: Mar. 4, 2004

(65) Prior Publication Data

US 2005/0232537 A1    Oct. 20, 2005

(30) Foreign Application Priority Data

Aug. 22, 2002 (JP) ............................ 2002-241982

(51) Int. Cl.
*G02B 6/32* (2006.01)
*H04J 14/02* (2006.01)

(52) U.S. Cl. ............................ 385/35; 385/31; 385/88; 385/92; 385/93; 385/38; 398/82; 398/88

(58) Field of Classification Search ................ 385/31, 385/33, 38, 39, 35, 79, 88, 89, 92, 93, 94, 385/14, 17; 398/82, 88
See application file for complete search history.

(56) References Cited

U.S. PATENT DOCUMENTS

| | | | | |
|---|---|---|---|---|
| 4,137,060 A | * | 1/1979 | Timmermann | 65/31 |
| 5,304,228 A | * | 4/1994 | Prince | 65/403 |
| 5,504,828 A | * | 4/1996 | Cina et al. | 385/33 |
| 6,741,777 B2 | * | 5/2004 | Jewell et al. | 385/49 |
| 2005/0232537 A1 | * | 10/2005 | Ishii et al. | 385/17 |

FOREIGN PATENT DOCUMENTS

| | | | | |
|---|---|---|---|---|
| JP | 3-26103 | | 3/1991 | ............... 385/38 X |
| JP | 10-221573 | | 8/1998 | ............... 385/38 X |
| JP | 2002-031727 | | 1/2002 | ............... 385/38 X |
| JP | 2002-221627 | | 8/2002 | ............... 385/38 X |

* cited by examiner

*Primary Examiner*—Brian M. Healy
(74) *Attorney, Agent, or Firm*—David G. Conlin; Steven M. Jensen; Edwards Angell Palmer & Dodge LLP

(57) ABSTRACT

An optical communication system has a plastic optical fiber (POF) and an optical communication module. The POF has a spherical end surface, and light emitted from the spherical end surface has an NA of 0.35 or lower. The POF is installed in the module such that a light receiving surface of a light receiving element (PD) is at a distance, d, from an apex of the spherical end surface. The distance, d, is within a range of $0 < d \leq r*D/(n-n1)$ when a PD diameter is not larger than D, and within a range of $D \leq d \leq r*D/(n-n1)$ when the PD diameter is larger than D, where D is a diameter of the POF, $r*D$ is a radius of curvature of the spherical end surface, n is a refractive index of a core of the POF, and n1 is a refractive index of a substance between the spherical end surface and the PD.

20 Claims, 12 Drawing Sheets

Fig. 10

PD Dia. 0.5D  NA0.35

| R \ d | 0.5D | D | 1.5D | 2D | 3D | 4D | 5D |
|---|---|---|---|---|---|---|---|
| D | ○ | ○ | ○ | ○ | × | × | × |
| 1.5D | ○ | ○ | ○ | ○ | ○ | △ | × |
| 2D | ○ | ○ | ○ | ○ | ○ | ○ | △ |

Fig. 11

PD Dia. D  NA0.35

| R \ d | 0.5D | D | 1.5D | 2D | 3D | 4D | 5D |
|---|---|---|---|---|---|---|---|
| D | ○ | ○ | ○ | ○ | △ | × | × |
| 1.5D | ○ | ○ | ○ | ○ | ○ | △ | × |
| 2D | ○ | ○ | ○ | ○ | ○ | ○ | △ |

Fig. 12

PD Dia. 1.5D  NA0.35

| R \ d | 0.5D | D | 1.5D | 2D | 3D | 4D | 5D |
|---|---|---|---|---|---|---|---|
| D | △ | △ | ○ | △ | × | × | × |
| 1.5D | △ | △ | ○ | ○ | ○ | △ | × |
| 2D | △ | △ | ○ | ○ | ○ | ○ | △ |

Fig. 13

PD Dia.0.5D    NA0.5

| R\d | 0.5D | D | 1.5D | 2D | 3D | 4D | 5D |
|---|---|---|---|---|---|---|---|
| D | ○ | ○ | ○ | △ | × | × | × |
| 1.5D | ○ | ○ | ○ | △ | × | × | × |
| 2D | ○ | ○ | ○ | ○ | △ | ○ | △ |

Fig. 14

PD Dia.D    NA0.5

| R\d | 0.5D | D | 1.5D | 2D | 3D | 4D | 5D |
|---|---|---|---|---|---|---|---|
| D | ○ | ○ | ○ | △ | × | × | × |
| 1.5D | ○ | ○ | ○ | △ | △ | △ | △ |
| 2D | ○ | ○ | ○ | ○ | △ | △ | △ |

Fig. 15

PD Dia.1.5D    NA0.5

| R\d | 0.5D | D | 1.5D | 2D | 3D | 4D | 5D |
|---|---|---|---|---|---|---|---|
| D | △ | ○ | ○ | △ | × | × | × |
| 1.5D | △ | ○ | ○ | ○ | △ | △ | × |
| 2D | △ | ○ | ○ | ○ | △ | △ | △ |

OPTICAL COMMUNICATION SYSTEM

This application is the U.S. National Phase entry of International Application No. PCT/JP2003/010543, filed on Aug. 21, 2003, which designated the United States. PCT/JP2003/010543 claims priority to Japanese Patent Application No. 2002-241982, filed on Aug. 22, 2002. The entire contents of these applications are incorporated by reference herein.

BACKGROUND OF THE INVENTION

The present invention relates to an optical communication system capable of transmitting and receiving an optical signal by means of an optical fiber and relates, in particular, to an optical communication system applicable to domestic communication, communication between electronic equipment, LAN (Local Area Network) and so on using a plastic optical fiber as a transmission medium.

An optical communication system using an optical fiber has a transmission system on one end side of a signal transmission path of the optical fiber and has a reception system on the other end side of the transmission path. The transmission system includes a light source (light emitting element) of, for example, a light emitting diode, a semiconductor laser or the like and makes a signal light, which is obtained by making the light emitting source emit light under control, incident on the optical fiber. On the other hand, the reception system includes a light receiving element of, for example, a photodiode or the like, and the light receiving element receives the signal light emitted from the optical fiber and converts the signal into an electrical signal.

The performance of the optical communication system largely depends on the transmission efficiency of the signal light. Moreover, the transmission efficiency is determined mainly by the transmission efficiency of the optical fiber itself, the coupling efficiency of the light emitting source to the optical fiber and the coupling efficiency of the optical fiber to the light receiving element.

The reception systems of the conventional optical communication systems are roughly categorized into two types: a type that receives outgoing light from the optical fiber directly on the light receiving element and a type that receives the outgoing light by collecting the light via an optical system such as f a lens or the like arranged between the optical fiber and the light receiving element.

Such a scheme of optical coupling between the optical fiber and the light receiving element is widely used for a quartz fiber whose core diameter is on the order of micrometers. However, a problem occurs in the case of a plastic optical fiber whose core diameter is on the order of millimeters. The plastic optical fiber is the optical fiber that has recently attracted attention for home network and the like. The plastic optical fiber has a large fiber diameter of 0.5 to 2 mm and is easy to connect, whereas it has a problem that the coupling efficiency to the receiver is reduced because of a large aperture. Normally, the diameter of light reception of the light receiving element used for optical fiber communication is several hundreds of micrometers to one hundred micrometers, and accordingly, there is no problem in the case of an optical fiber of a small core diameter. However, in the case of, for example, a plastic optical fiber having an aperture of 1 mm, it is difficult to collect light to a size smaller than the size of the light source even when a lens or the like is used. Particularly, the diameter of light reception is required to be reduced in relation to capacity as the transmission rate is increased, and therefore, a reduction in the coupling efficiency, i.e., the reception efficiency occurs.

To solve the problem, an optical communication system, which has a structure for coupling the optical fiber with the light receiving element as shown in FIG. 25, is known. In this optical communication system, an optical guide 101, which has an optical guide path 102 enclosed by a highly reflective reflection surface 103, is placed between an optical fiber 104 and a light receiving element 105, and a signal light emitted from the optical fiber 104 is guided to the light receiving element 105 by the optical guide 101. With this arrangement, the optical fiber 104 is optically coupled with the light receiving element 105 with high efficiency, and even outgoing light from an optical fiber of a large core diameter such as the plastic optical fiber can efficiently be collected to a photodiode of a small aperture (refer to JP 10-221573 A, paragraph 0008 and FIGS. 1 and 3).

In the case of the structure as shown in FIG. 25, when the numerical aperture (NA) of the light emitted from the optical fiber is changed, and particularly enlarged, there is a drawback that the outgoing light 106 tends to return to the optical fiber 104 side as shown in FIG. 26, so that the coupling efficiency is reduced. Moreover, the structure has a manufacturing problem that the aspect ratio of the hole depth to the aperture is large, so that it is difficult to uniformly deposit a reflection coating.

SUMMARY OF THE INVENTION

Accordingly, an object of the present invention is to provide an optical communication system capable of efficiently achieving optical coupling of an optical fiber of a large aperture like the plastic optical fiber with a light receiving element of a small aperture with a simple construction.

An optical communication system according to an aspect of the present invention comprises:

an optical fiber having a spherical end surface at at least one end thereof, wherein radiant light emitted from the spherical end surface has a numerical aperture of not larger than 0.35; and an optical communication module which has a light receiving element and receives the radiant light emitted from the spherical end surface of the optical fiber, wherein, when the one end of the optical fiber is inserted in a prescribed portion inside the optical communication module, a light receiving surface of the light receiving element is located at a distance, d, from an apex of the spherical end surface of the optical fiber, and assuming that a diameter of the optical fiber is D, a radius of curvature, R, of the spherical end surface is r*D, a refractive index of a core of the optical fiber is n, and a refractive index of a substance that exists between the spherical end surface of the optical fiber and the light receiving element is n1, then the distance, d, is:

within a range of $0 < d \leq r*D/(n-n1)$ when a diameter of the light receiving element is not larger than D, and within a range of $D \leq d \leq r*D/(n-n1)$ when the diameter of the light receiving element is larger than D.

It is to be noted that the "diameter of the optical fiber" here indicates the core diameter. In the case of an SI type plastic optical fiber, the cladding portion accounts for only two percent of the total diameter of the fiber and therefore, the diameter of the optical fiber becomes approximately equal to the core diameter.

By forming the end surface of the optical fiber into the spherical end surface and arranging the light receiving element so that the distance, d, is within the range, the reception coupling efficiency can be improved to two times or more at maximum in comparison with the case where the end surface of the optical fiber is a flat surface.

The end surface of the fiber processed into a spherical shape is considered to be equivalent to a structure in which a plano-convex lens that has a convex surface in a direction in which the light from the fiber is emitted is attached to a flat surface of the fiber. A value obtained from $r*D/(n-n1)$, i.e., $R/(n-n1)$ indicates a focal distance, f, in a space filled with a substance of a refractive index n1, of the plano-convex lens of which the radius of curvature is R and the refractive index is n.

FIGS. 3A through 3C are schematic views showing the relation between the spread (far-field pattern: FFP) of outgoing light L from the optical fiber and the radius of curvature, R (=$r*D$), of the spherical end surface 11 provided by processing the optical fiber end surface, the relation having been obtained from the simulation carried out in the air (n1=1) with the plastic optical fiber 1 whose core is made of PMMA (refractive index≈1.5).

If a multi-mode optical fiber, in particular, an SI (Step-Index) type multi-mode optical fiber is cut along a plane perpendicular to the axial direction of the fiber, then its near-field pattern can be regarded as a surface light source of uniform intensity. Moreover, the orientation distribution of the outgoing light from each of points into which the surface light source of the uniform intensity is subdivided, is Gaussian distribution.

As is apparent from FIGS. 3A through 3C, the position where the outgoing lights are collected differs depending on the radius of curvature of the spherical end surface of the fiber. FIG. 3A shows a case where the radius of curvature, R, of the spherical end surface is two times the fiber diameter, D, i.e., R=$2*D$, and the light collection position is located at the distance of 4D from the apex of the spherical end surface. FIG. 3B shows a case where the radius of curvature, R, of the spherical end surface is one and half times the fiber diameter, D, i.e., R=$1.5*D$, and the light collection position is located at the distance of 3D from the apex of the spherical end surface. FIG. 3C shows a case where the radius of curvature, R, of the spherical end surface is equal to the fiber diameter, D, i.e., R=D, and the light collection position is located at the distance of 2D from the apex of the spherical end surface.

The focal distance, f, of the plano-convex lens in the air is expressed by $f=R/(n-1)$ from the above, and the simulation results shown in FIGS. 3A through 3C almost coincide with the focal distance, f, in the air when the refractive index of the plano-convex lens is set to 1.5.

That is, according to the present invention, the light receiving surface of the light receiving element is placed within the focal distance, f, when the outgoing light from the optical fiber has a small numerical aperture (NA) of 0.35 or below. However, the results of various experiments conducted by the inventors have indicated that when the diameter of the light receiving element is larger than the diameter, D, of the optical fiber, only the coupling efficiency equivalent to that of the optical fiber of which the end surface is flat can be obtained until the distance, d, exceeds D. That is why the distance, d, is made not smaller than D. Therefore, the radiant light emitted from the optical fiber end surface is collected by the plano-convex lens effect and made incident on the light receiving element before spreading again. Consequently, the coupling efficiency to the light receiving element is improved and becomes higher than when the end surface of the optical fiber is flat. Furthermore, an optical guide as required in the prior art case is not used, and therefore, the optical communication module is easily manufactured by that much.

The optical fiber of which the NA of the outgoing light is 0.35 is used mainly for high speed transmission at a transmission rate of about 200 to 622 Mbps. Normally, it is necessary to reduce the diameter of the light receiving element in relation to the capacity as the transmission rate is increased. Moreover, the higher the transmission rate, the smaller the structural NA of the optical fiber to be used. In accordance with the above, the NA of the light emitted from the optical fiber also becomes small. The present invention is effective particularly when the diameter of the light receiving element is small and a plastic optical fiber of a small optical fiber NA is used, i.e., at the time of high speed transmission of several hundreds of Mbps with a plastic optical fiber used.

In the optical communication system of the present invention, the communication module may have, in addition to the light receiving element, a reception optical system that guides the light emitted from the spherical end surface of the optical fiber to the light receiving element. In this case, not the light receiving surface of the light receiving element but a center position of the reception optical system is to be arranged at the distance, d, from the spherical end surface of the optical fiber according to the size of the reception optical system as follows. That is, the reception optical system is arranged so that the distance, d, from the spherical end surface of the optical fiber to the center position of the reception optical system is:

within the range of $0<d\leq r*D/(n-n1)$ when the size of the reception optical system is not larger than D, and within the range of $D\leq d\leq r*D/(n-n1)$ when the size of the reception optical system is larger than D.

Examples of the reception optical system include a light refracting member, such as a prism, a lens or the like, which is formed of a substance of a refractive index different from that of air, and a light reflecting member such as a mirror or the like. When a transparent molded piece or the like of a refractive index different from that of air is formed on the light receiving element, even such a molded piece is treated as a reception optical system in the present application.

Herein, the "center position of the reception optical system" means a principal point on the incidence side upon the reception optical system of the principal ray of light from the optical fiber.

Moreover, the "size of the reception optical system" is defined as the diameter of a portion of the system that optically collect the light when the shape of the reception optical system is circular (e.g., condenser lens), and is defined as a typical dimension of a portion of the system that optically collect the light when the shape is not circular (e.g., prism).

According to various simulation results, the distance, d, should preferably be:

within a range of $0<d\leq 2D$ when the diameter of the light receiving element is not larger than D, and within a range of $D\leq d\leq 2D$ when the diameter of the light receiving element is larger than D.

Moreover, the present invention is more effective when the diameter of the light receiving element (or the size of the reception optical system when the reception optical system is provided) is not larger than the diameter, D, of the optical fiber. This is because the effect of improvement in the coupling efficiency upon the optical fiber having a flat end surface is more remarkable than in the case where the diameter of the light receiving element (or the size of the reception optical system when the reception optical system is provided) is larger than the diameter, D, of the optical fiber.

An optical communication system according to another system comprises:

an optical fiber having a spherical end surface at at least one end thereof, wherein radiant light emitted from the spherical end surface has a numerical aperture of 0.4–0.6 inclusive; and an optical communication module which has a light receiving element and receives the radiant light emitted from the spherical end surface of the optical fiber, wherein, when the one end of the optical fiber is inserted in a prescribed portion inside the optical communication module, a light receiving surface of the light receiving element is located at a distance, d, from an apex of the spherical end surface of the optical fiber, and assuming that a diameter of the optical fiber is D, then the distance, d, is:

within a range of $0<d<2D$ when a diameter of the light receiving element is not larger than D, and within a range of $0.5D<d<2D$ when the diameter of the light receiving element is larger than D.

The numerical aperture of the outgoing light within the range of from 0.4 to 0.6, in particular, the numerical aperture of 0.5 is used for medium speed transmission at a transmission rate of about 20 to 100 Mbps.

In this optical communication system, the communication module may have, in addition to the light receiving element, a reception optical system that guides the light emitted from the spherical end surface of the optical fiber to the light receiving element. In this case, not the light receiving surface of the light receiving element but a center position of the reception optical system is to be arranged at the distance, d, from the spherical end surface of the optical fiber according to the size of the reception optical system as follows. That is, the reception optical system is arranged so that the distance, d, from the spherical end surface of the optical fiber to the center position of the reception optical system is:

within the range of $0<d<2D$ when a size of the reception optical system is not larger than D, and within the range of $0.5D<d<2D$ when the size of the reception optical system is larger than D.

By forming the end surface of the optical fiber into a spherical end surface and arranging the reception optical system such that the distance, d, is within the range, the reception coupling efficiency can be improved up to about 1.7 times at maximum as large as in the case where the end surface of the optical fiber is a flat surface.

The definitions of the "center position of the reception optical system" and the "size of the reception optical system" are as described above.

According to various simulation results, the distance, d, should preferably be:

within a range of $0<d\leq1.5D$ when the diameter of the light receiving element is not larger than D, and within a range of $D\leq d\leq1.5D$ when the diameter of the light receiving element is larger than D.

Similarly to the case where the numerical aperture is not larger than 0.35, the diameter of the light receiving element (the size of the reception optical system when the reception optical system is provided) should preferably be not larger than the diameter, D, of the optical fiber. This is because the effect of improvement in the coupling efficiency upon the optical fiber having a flat end surface is more remarkable than in the case where the diameter of the light receiving element (or the size of the reception optical system when the reception optical system is provided) is larger than the diameter, D, of the optical fiber. Therefore, if the present invention is utilized, then a small-sized reception optical system, which easily collects light on a small light receiving element, can be arranged. In this case, the present invention is more effective in single-core two-way communication.

In one embodiment, each of the above-described optical communication modules further comprises, of a light emitting element and a transmission optical system, at least the light emitting element such that the optical communication module is able to transmit and receive a signal light via the optical fiber to and from a counterpart optical communication module in a single-core two-way communication scheme. This arrangement is effective from the viewpoint of combined arrangement of the transmission system and the reception system since the light receiving element and the reception optical system can be reduced in size.

As described above, when the plastic optical fiber is used, a common fiber diameter is from 0.5 mm to 2 mm. Among others, a fiber having a diameter of 1 mm is widely used from the viewpoint of easiness of use, i.e., easiness of connection and suppression of modal dispersion. On the other hand, the transmission rate of high speed communication generally used for the plastic optical fiber is from 100 Mbps to 622 Mbps, and the diameter of a photodiode (also referred to as a "PD diameter" below) suitable for that transmission rate is not larger than 0.5 mm and more precisely from 0.3 mm to 0.5 mm.

In one embodiment, an optical fiber that has a diameter, D, of 1 mm and a small-sized photodiode that has a diameter of not larger than 0.5 mm (e.g., 0.3 mm to 0.5 mm) and is able to cope with high speed are used in combination in either one of the communication systems. The combination of such dimensions of the optical fiber and the light receiving element is effective since the reception efficiency can largely be improved by the application of the present invention in comparison with the fiber of a flat end surface.

Moreover, in the case where the reception optical system is provided, if the optical fiber of which the diameter, D, is 1 mm is used, the size of the reception optical system should preferably be made 0.5 mm or smaller for the same reasons as those described immediately before.

BRIEF DESCRIPTION OF THE DRAWINGS

FIG. 10 is a table in which the reception coupling efficiencies, shown in the graph of FIG. 4, for the optical fibers (emission NA=0.35) each having a spherical end surface in comparison with the fiber having a flat end surface are classified under three groups;

FIG. 11 is a table in which the reception coupling efficiencies, shown in the graph of FIG. 5, for the optical fibers (emission NA=0.35) each having a spherical end surface in comparison with the fiber having a flat end surface are classified under three groups;

FIG. 12 is a table in which the reception coupling efficiencies, shown in the graph of FIG. 6, for the optical fibers (emission NA=0.35) each having a spherical end surface in comparison with the fiber having a flat end surface are classified under three groups;

FIG. 13 is a table in which the reception coupling efficiencies, shown in the graph of FIG. 7, for the optical fibers (emission NA=0.5) each having a spherical end surface in comparison with the fiber having a flat end surface are classified under three groups;

FIG. 14 is a table in which the reception coupling efficiencies, shown in the graph of FIG. 8, for the optical fibers (emission NA=0.5) each having a spherical end surface in comparison with the fiber having a flat end surface are classified under three groups;

FIG. 15 is a table in which the reception coupling efficiencies, shown in the graph of FIG. 9, for the optical fibers (emission NA=0.5) each having a spherical end surface in comparison with the fiber having a flat end surface are classified under three groups;

DETAILED DESCRIPTION OF THE INVENTION

Figure 1:
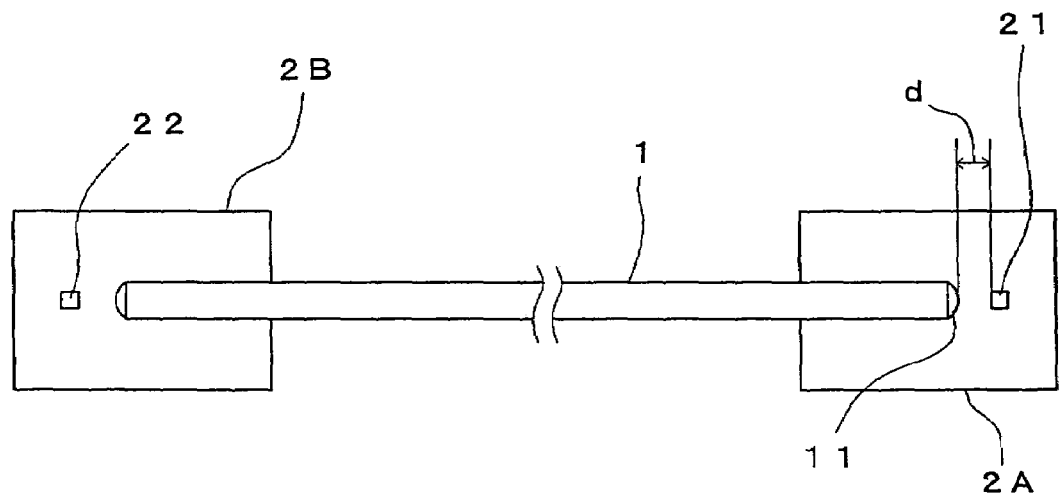
FIG. 1 is a view schematically showing the construction of an optical communication system according to one embodiment of the present invention.

The present invention will be described in detail below on the basis of the embodiments shown in the drawings.

(First Embodiment)

FIG. 1 schematically shows one example of the optical communication system for carrying out one-way communication as an embodiment of the optical communication system of the present invention. This optical communication system includes an optical fiber 1 and a pair of optical communication modules 2A and 2B for transmitting and receiving a signal light via the optical fiber 1. The optical communication module 2B has a light emitting element 22 constructed of a semiconductor laser device (LD) or a light emitting diode (LED) and functions as a transmission module. On the other hand, the optical communication module 2A has a light receiving element 21 constructed of a photodiode (PD) and functions as a reception module. For the sake of simplicity, portions that have no direct relation to the invention, such as parts retaining the light receiving and emitting elements and so on, are not shown in FIG. 1.

The optical fiber 1 is a plastic optical fiber whose core is made of PMMA (refractive index: approximately 1.5), and both end surfaces are each formed into a spherical end surface 11 that has a radius of curvature, $R_r$. It is to be noted that only the end surface on the reception side may be formed into the spherical end surface 11. Moreover, the optical fiber 1 may be made of a plastic material other than PMMA. The spherical end surface 11 of the optical fiber can be formed by melting or polishing.

When the end portion of the optical fiber 1 is inserted into the optical communication module 2A and placed in a prescribed location, the light receiving surface of the light receiving element 21 is located in a position at a distance, d, from the apex of the spherical end surface 11 of the optical fiber 1. The distance, d, has a value set in accordance with the numerical aperture (also referred to as an "emission NA" below) of the radiant light emitted from the spherical end surface 11 of the optical fiber 1 and the diameter (also referred to as a "PD diameter" below) of the photodiode 21 that is the light receiving element.

Concretely, in the case where the emission NA of the optical fiber 1 is not larger than 0.35 used for high speed transmission at a transmission rate of 200 to 622 Mbps, the distance, d, is set within a range of:

$$0 < d \leq r*D/(n-n1) \quad (1)$$

when the diameter of the light receiving element is not larger than D, and $$D \leq d \leq r*D/(n-n1) \quad (2)$$

when the diameter of the light receiving element is larger than D. In the above expressions, D represents the diameter (core diameter) of the optical fiber 1, r*D expresses the radius of curvature, R, of the spherical end surface 11 using D, n represents the refractive index of the core of the optical fiber 1, and n1 represents the refractive index of the substance that exists between the spherical end surface 11 of the optical fiber 1 and the light receiving element 21. In the case of the present embodiment, the substance that exists between the spherical end surface 11 of the optical fiber 1 and the light receiving element 21 is air. Therefore, n1 is one. The refractive index of the core material of PMMA (polymethyl is methacrylate) of the optical fiber 1 is approximately 1.5 (treated as 1.5 here for calculation) Therefore, the relational expressions (1) and (2) can be rewritten as:

$$0 < d \leq 2r*D \quad (1')$$ and $$D \leq d \leq 2r*D \quad (2')$$

respectively.

The expression (1') indicates that the light receiving surface of the light receiving element 21 is not in contact with the spherical end surface 11 of the optical fiber 1 and not located away from the spherical end surface 11 of the optical fiber 1 by an amount in excess of a distance that corresponds to two times the radius of curvature of the spherical end surface 11. The expression (2') indicates that the light receiving surface of the light receiving element 21 is located away from the spherical end surface 11 of the optical fiber 1 by an amount equal to or more than a distance that corresponds to the diameter of the optical fiber 1, but not in excess of the distance that corresponds to two times the radius of curvature of the spherical end surface 11.

On the other hand, in the case where the emission NA of the optical fiber 1 is about 0.5 (i.e., 0.4 to 0.6) used for medium speed transmission at a transmission rate of about 100 to 200 Mbps, the distance, d, is set within a range of:

$$0 < d \leq 2D \quad (3)$$

when the diameter of the light receiving element is not larger than D, and $$0.5D < d < 2D \quad (4)$$

when the diameter of the light receiving element is larger than D.

Figure 4:
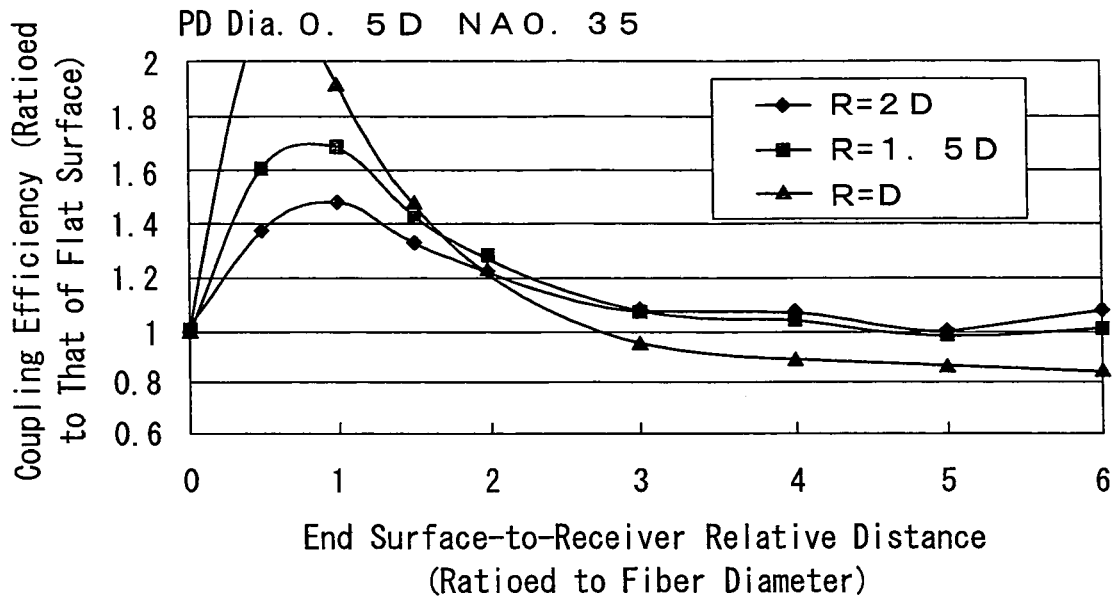
FIG. 4 is a graph indicating the effects of the present invention, in which under the condition that the diameter of the light receiving element is 0.5D and the fiber emission NA is 0.35, the reception coupling efficiency in the case where a fiber with a spherical end surface is used is compared with that of the case where a fiber with a flat end surface is used.
Figure 5:
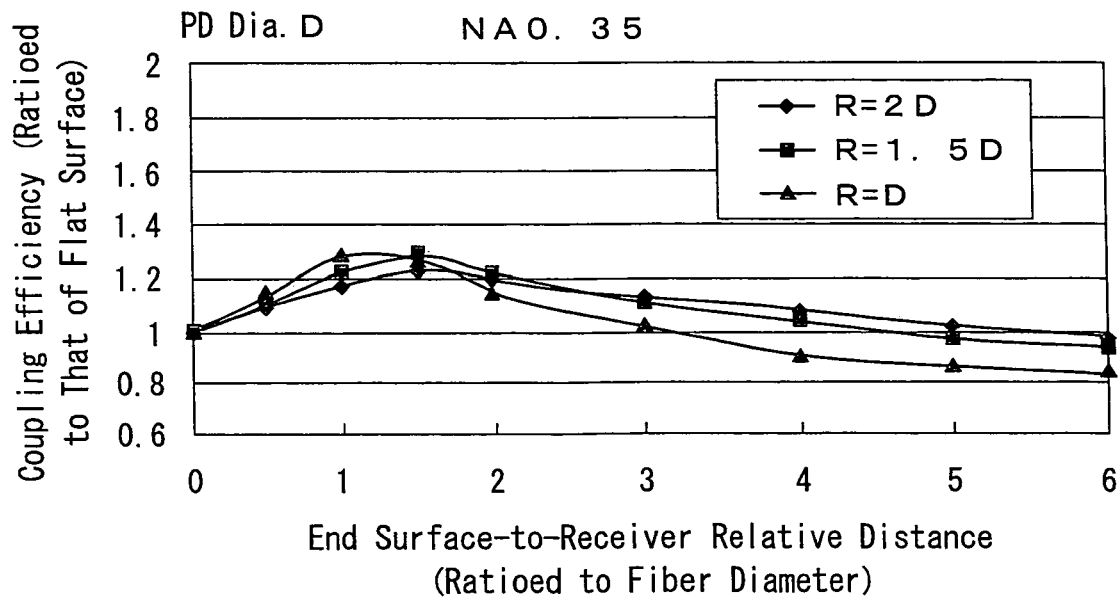
FIG. 5 is a graph indicating the effects of the present invention, in which under the condition that the diameter of the light receiving element is D and the fiber emission NA is 0.35, the reception coupling efficiency in the case where a fiber with a spherical end surface is used is compared with that of the case where a fiber with a flat end surface is used.
Figure 6:
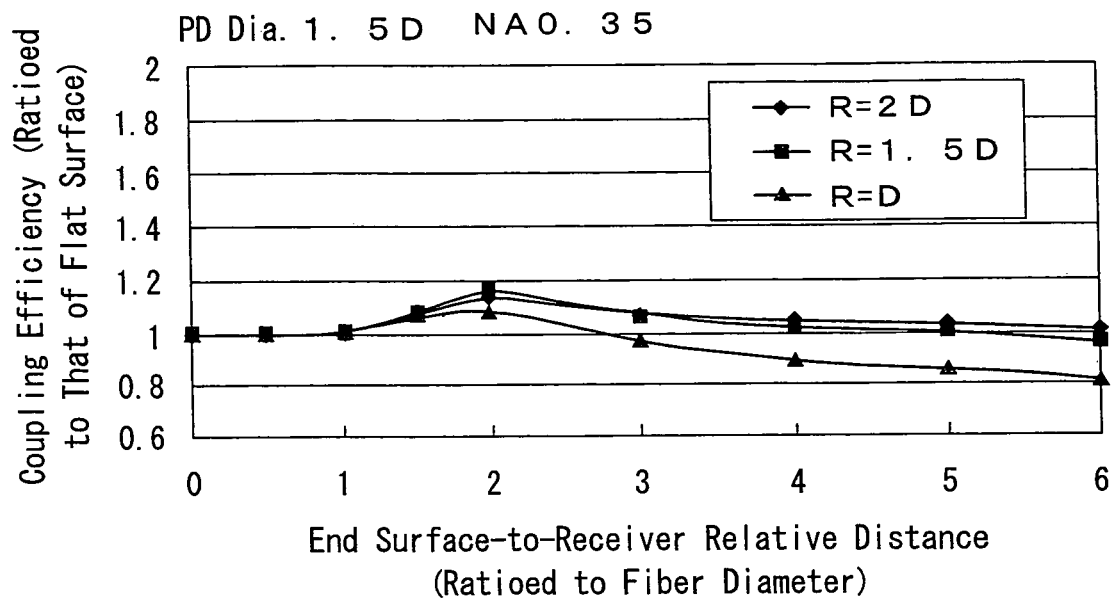
FIG. 6 is a graph indicating the effects of the present invention, in which under the condition that the diameter of the light receiving element is 1.5D and the fiber emission NA is 0.35, the reception coupling efficiency in the case where a fiber with a spherical end surface is used is compared with that of the case where a fiber with a flat end surface is used.

FIGS. 4 through 6 are graphs showing the dependence of the reception coupling efficiency on end surface-to-receiver distance in the case where the emission NA of the optical fiber 1 is 0.35 in the optical communication system that has the construction of FIG. 1, in comparison with the case of a fiber having a flat end surface, where each parameter is expressed by using the fiber diameter, D. More in detail, the reception coupling efficiency plotted on the vertical axis of the graph is a reception coupling efficiency obtained when the numerical aperture of outgoing light from the optical fiber, which light is defined by an intensity of $1/e^2$ ($\approx 0.135$) when the fiber emission end surface is a flat surface, is 0.35, the transmission rate is 200–500 Mbps, a semiconductor laser (LD) is used as a light source, and a low NA and high speed communication grade plastic optical fiber (refractive index, n, of the core is 1.5) is used as the transmission medium. The coupling efficiency in the graphs is expressed in the form of a ratio to the coupling efficiency for the flat fiber end surface (i.e., a coupling efficiency of one ("1") means a coupling efficiency when the fiber end surface is a flat surface). The horizontal axis represents the end surface-to-receiver distance (distance between the end surface and the receiver) in the form of a ratio to the fiber diameter, D. Moreover, the radius of curvature, R, of the end surface and the PD diameter, which are the parameters, are expressed by using the fiber diameter, D. FIGS. 4, 5 and 6 show the case where the PD diameter is 0.5D, the case where the PD diameter is 1D and the case where the PD diameter is 1.5D, respectively. Moreover, the marks ♦, ■ and ▲ represent the cases where the radius of curvature, R, of the end surface is 2D, 1.5D and D, respectively. It is to be noted that the "receiver" refers to the photodiode 21 in this case.

Moreover, FIGS. 10 and 11 show the effects concerning the reception coupling efficiency shown in the graphs of FIGS. 4 through 6, tabulated under three groups, where "○" indicates that the reception coupling efficiency is more than 1.01 times that of the fiber with the flat end surface, "Δ" indicates that the reception coupling efficiency is 0.99 to 1.01 times that of the fiber with the flat end surface, and "x" indicates that the reception coupling efficiency is less than 0.99 times that of the fiber with the flat end surface.

Figure 3A:
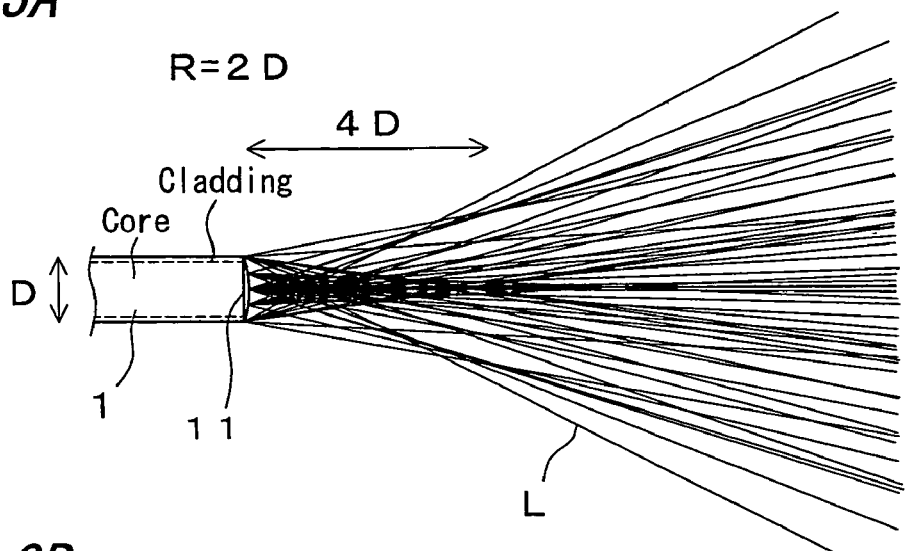
FIGS. 3A, 3B and 3C are diagrams for explaining the principle of the present invention.
Figure 3B:
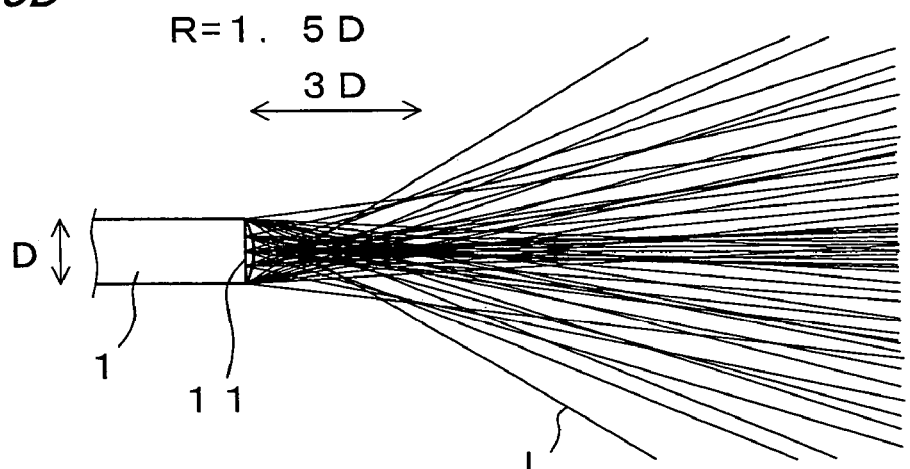
Figure 3C:
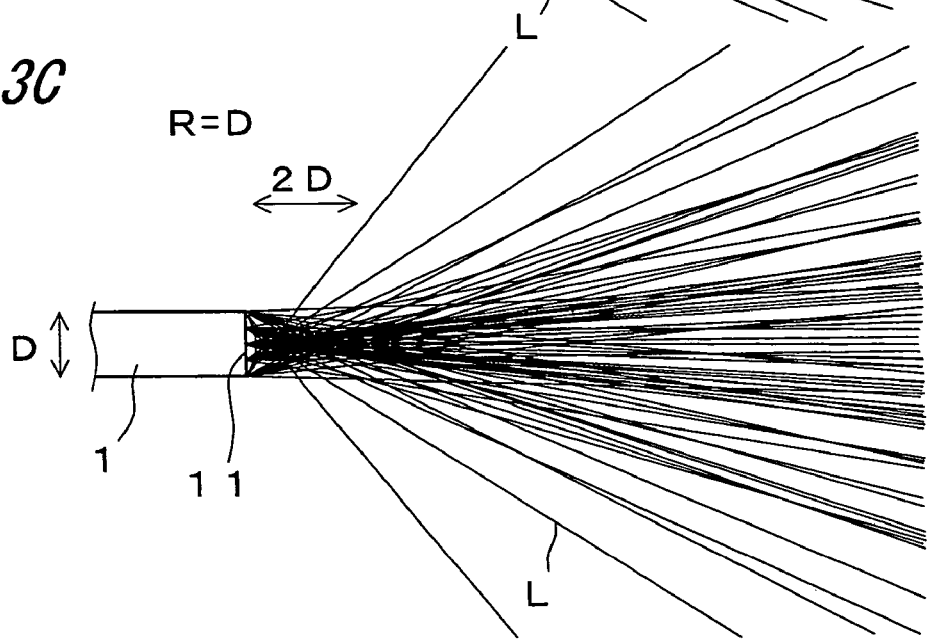

It can be seen from the graphs that the reception efficiency has been improved, as compared with the case of the fiber end surface being flat, until after a position corresponding to the focal position determined by the radius of curvature, R (=r*D), of the spherical end surface shown in FIGS. 3A through 3C (in this case, because n=1.5 and n1=1, f=r*D/ 0.5=2r*D) is reached. It is to be noted that the effect is larger when the PD diameter is smaller. It can also be understood that when the PD diameter is 0.5D, the reception efficiency can be increased as the radius of curvature, R, of the end surface is smaller. In any case, when the PD diameter is not larger than the fiber diameter, D, the effect of increasing the reception efficiency is enjoyed from the position of the fiber end surface to the position that corresponds to the focal position.

On the other hand, it can be understood that when the PD diameter is larger than the fiber diameter, D, there is an increase in the reception efficiency from the position located away from the fiber end surface by 1D to the position that corresponds to the focal position determined by the radius of curvature, R (=r*D), of the spherical end surface.

Figure 7:
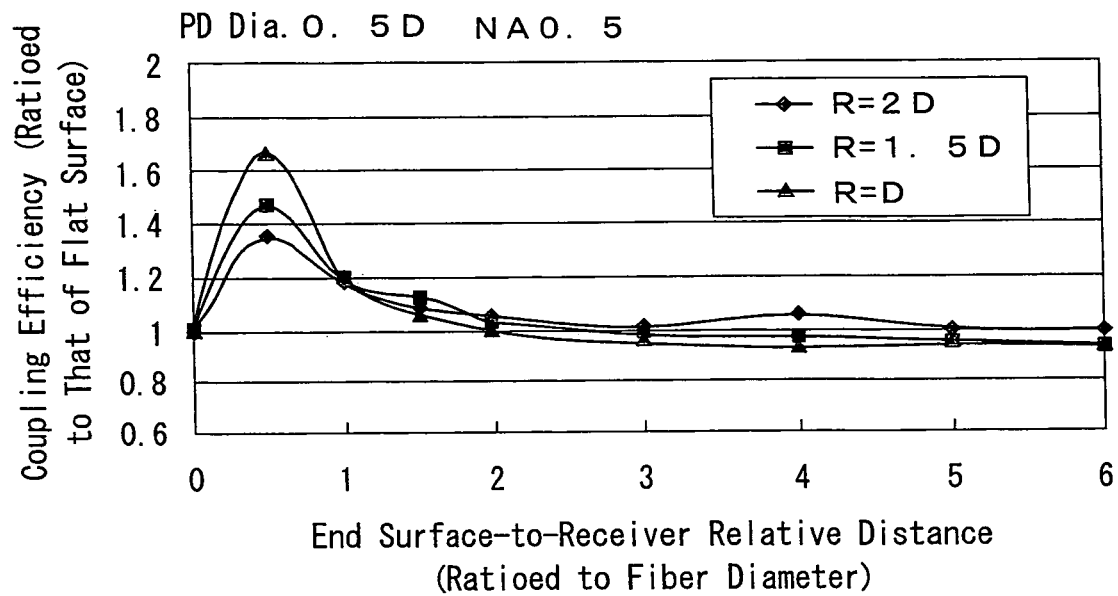
FIG. 7 is a graph indicating the effects of the present invention, in which under the condition that the diameter of the light receiving element is 0.5D and the fiber emission NA is 0.5, the reception coupling efficiency in the case where a fiber with a spherical end surface is used is compared with that of the case where a fiber with a flat end surface is used.
Figure 8:
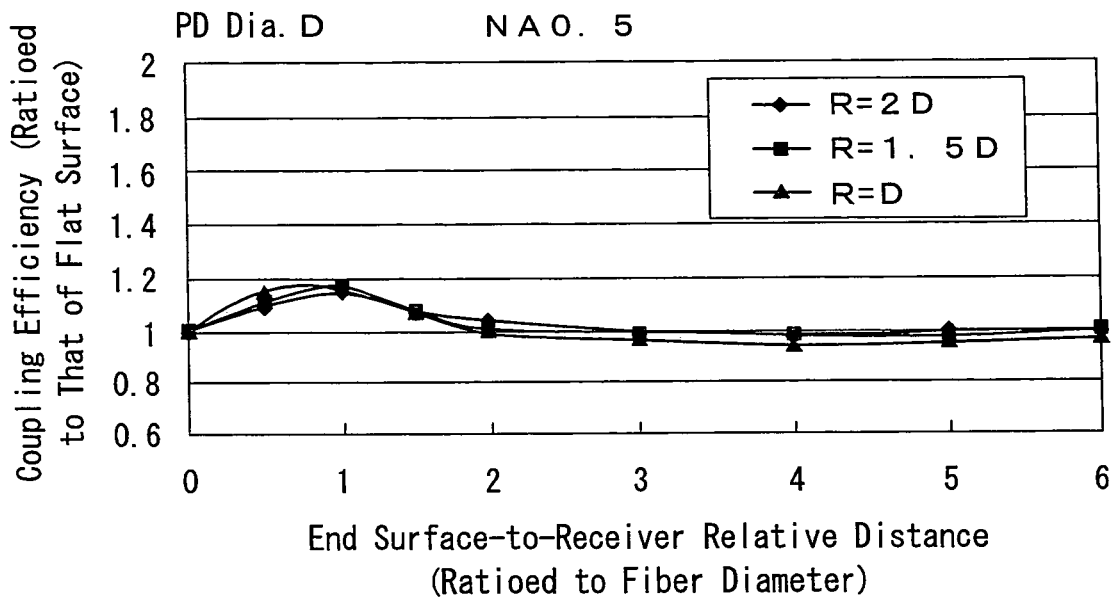
FIG. 8 is a graph indicating the effects of the present invention, in which under the condition that the diameter of the light receiving element is D and the fiber emission NA is 0.5, the reception coupling efficiency in the case where a fiber with a spherical end surface is used is compared with that of the case where a fiber with a flat end surface is used.
Figure 9:
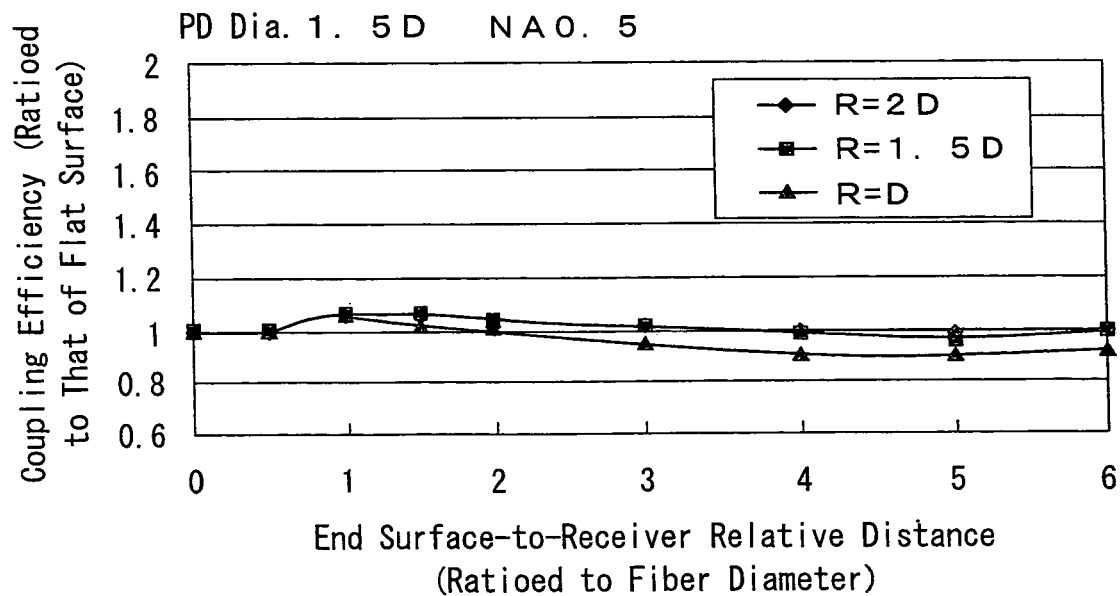
FIG. 9 is a graph indicating the effects of the present invention, in which under the condition that the diameter of the light receiving element is 1.5D and the fiber emission NA is 0.5, the reception coupling efficiency in the case where a fiber with a spherical end surface is used is compared with that of the case where a fiber with a flat end surface is used.

FIGS. 7 through 9 show graphs similar to those of FIGS. 4 through 6, showing the coupling efficiency obtained when the fiber emission NA of light from an optical fiber, which light is defined by an intensity of $1/e^2$ when the fiber emission end surface is a flat surface, is 0.5. In this case, however, the transmission rate was from 100 to 200 Mbps, an LED was used as a light source (light emitting element), and a plastic optical fiber (refractive index, n, of the core is 1.5) with a communication grade of an NA of about 0.5 was used as a transmission medium. FIGS. 7, 8 and 9 respectively show the case where the PD diameter is 0.5D, the case where the PD diameter is 1D, and the case where the PD diameter is 1.5D.

FIGS. 13 through 15 show the effects regarding the reception coupling efficiency shown in the graphs of FIGS. 7 through 9, tabulated under three groups, where "○" indicates that the reception coupling efficiency is more than 1.01 times that of the fiber with the flat end surface, "Δ" indicates that the reception coupling efficiency is 0.99 to 1.01 times that of the fiber with the flat end surface, and "x" indicates that the reception coupling efficiency is less than 0.99 times that of the fiber with the flat end surface, similarly to FIGS. 10 through 12.

It is apparent from FIGS. 7 through 9 and FIGS. 13 through 15 that when the PD diameter is smaller than the fiber diameter, D, the reception efficiency has been improved in a range from the neighborhood of the fiber end surface to the position of 2D, as compared with the case where the fiber end surface is the flat surface, although the effect of improvement in the reception efficiency in this case is smaller than when the NA of the fiber emission defined by the intensity of $1/e^2$ is 0.35. Also, it is apparent that also in this case as well, the reception efficiency can be increased as the radius of curvature, R, of the end surface is smaller when the PD diameter is smaller than the fiber diameter, D, (provided that the distance, d, is within 1D). Moreover, it has been found that even when the PD diameter is larger than the fiber diameter, D, there is an effect of improvement in the reception efficiency as far as the distance is within the range of from the neighborhood of the fiber end surface D to the position of 2D although the degree of improvement is reduced.

Figure 16:
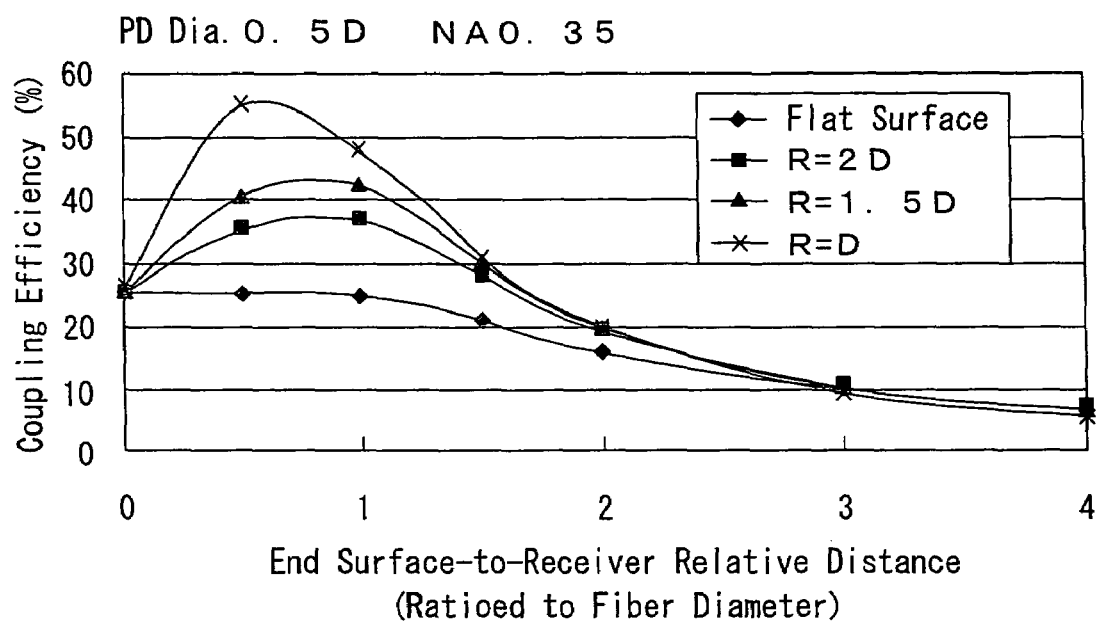
FIG. 16 is a graph indicating the effects of the present invention, in which under the condition that the diameter of the light receiving element is 0.5D and the fiber emission NA is 0.35, the reception coupling efficiency in the case where a fiber with a spherical end surface is used is compared with that of the case where a fiber with a flat end surface is used.
Figure 17:
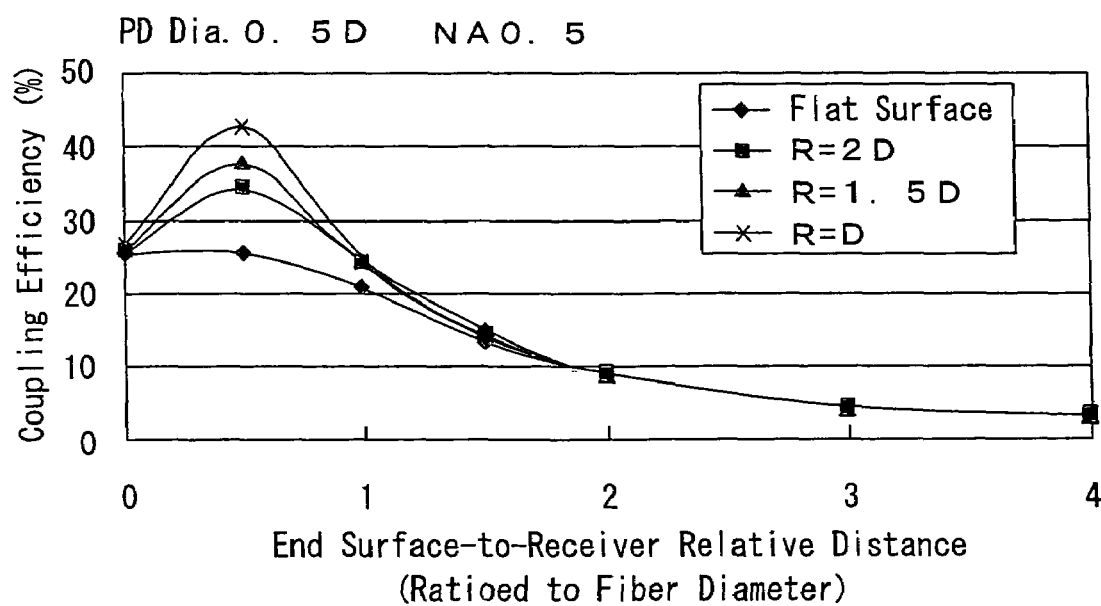
FIG. 17 is a graph indicating the effects of the present invention, in which under the condition that the diameter of the light receiving element is 0.5D and the fiber emission NA is 0.5, the reception coupling efficiency in the case where a fiber with a spherical end surface is used is compared with that of the case where a fiber with a flat end surface is used.

FIGS. 16 and 17 are graphs showing the distance dependence of the reception coupling efficiency with the radius of curvature, R, of the fiber spherical end surface 11 changed, as compared with that of the case having the flat fiber end surface, where the diameter of the light receiving element 21 is 0.5D and the NA of fiber emission defined by the intensity of $1/e^2$ when the fiber emission end surface is a flat surface is 0.35 and 0.5, respectively. It is apparent from these graphs that when the fiber end surface is a spherical end surface, the reception efficiency (coupling efficiency) can be increased within the distance range defined by the expressions (1) and (3), in comparison with the case where the fiber end surface is a flat surface. Above all, when the radius of curvature, R, of the spherical end surface 11 is D and the distance, d, is in the neighborhood of 0.5D, the coupling efficiency is largely improved in comparison with the fiber with a flat end surface regardless of whether the NA of the emission from the optical fiber is 0.35 or 0.5. Moreover, it can be said that with respect to one distance, d, the coupling efficiency is increased as the radius of curvature, R, of the end surface becomes smaller, i.e., as the curvature becomes larger, as far as the distance, d, is within a prescribed range.

Figure 18:
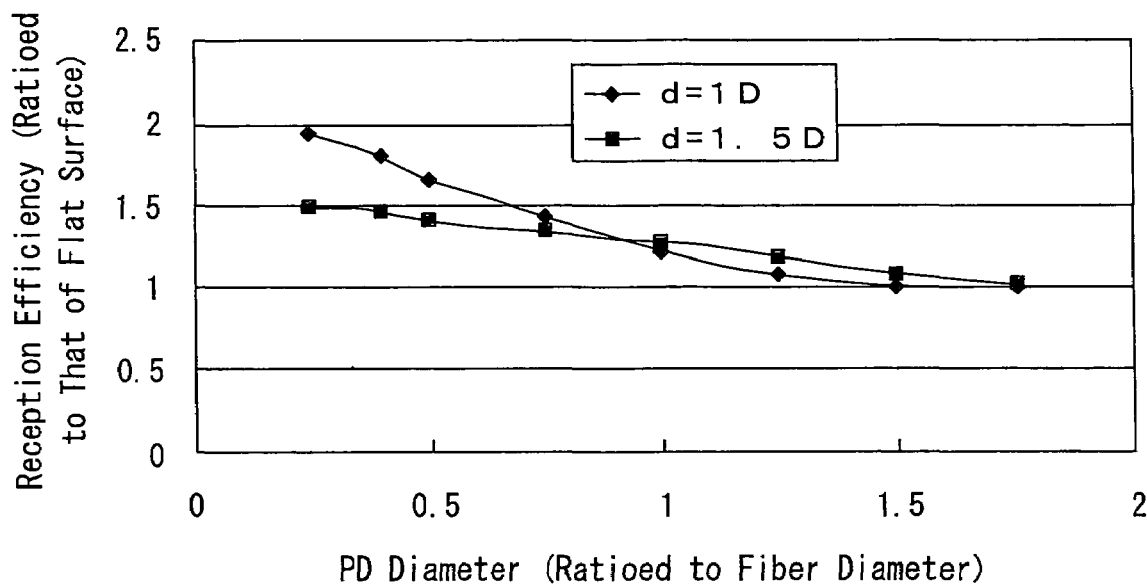
FIG. 18 is a graph indicating the effects of the present invention, and showing the PD diameter dependence of the reception coupling efficiency.

FIG. 18 is a graph in which the dependence of the reception efficiency on the light receiving element diameter (PD diameter) is plotted using the distance, d, as a parameter in the case where the NA of the fiber emission, which is defined by the intensity of $1/e^2$ when the fiber emission end surface is a flat surface, corresponds to 0.35. It is apparent from FIG. 18 that the arrangement is effective as the PD diameter is smaller and, in particular, when the PD diameter is smaller than the fiber diameter of 1D. Also, it can be seen that a higher reception efficiency is obtainable when the distance, d, is 1D than when it is 1.5D, in the case where the PD diameter is smaller than the fiber diameter of 1D and, in particular, when the fiber diameter is not larger than approximately 0.9D. It is regarded as effective to set the distance, d, to a value within 1D when the PD diameter is smaller than the fiber diameter, D.

Figure 19:
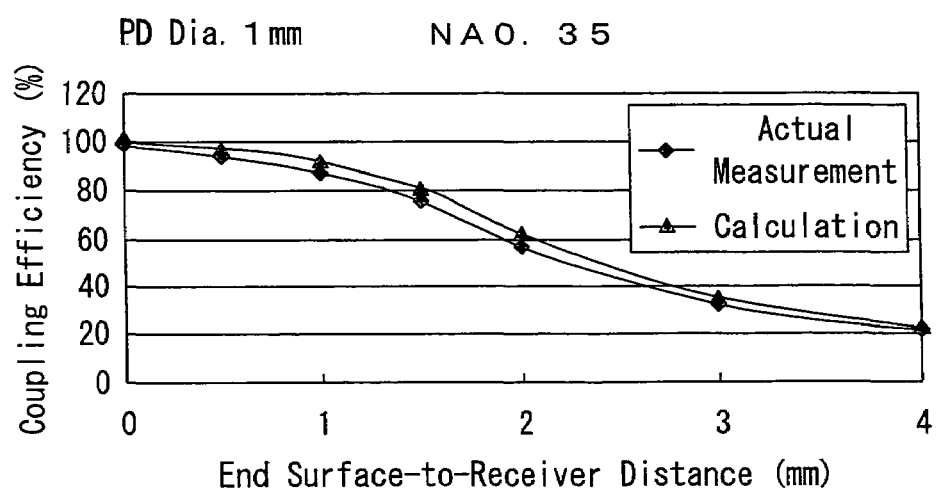
FIG. 19 is a graph indicating the effects of the present invention, and showing comparison between the actually obtained values of the reception coupling efficiency and the values obtained by simulation.

FIG. 19 is a graph showing a comparison between calculated values and actual measurement results in the case where the NA of emission from the optical fiber 1, which emission is defined by the intensity of $1/e^2$ when the fiber emission end surface is a flat surface, corresponds to 0.35, the optical fiber diameter is 1 mm, the radius of curvature of the fiber spherical end surface 11 is 1.5 mm, and the PD diameter is 1 mm. Both the calculated values and the actual measurement values almost coincide with each other and exhibit the same tendency. It was confirmed that a coupling efficiency exceeding 30% was obtained when the end surface-to-receiver distance (i.e., the distance, d,) plotted on the horizontal axis was within a range of 0 to 3 mm and that the coupling efficiency approached 100% as the distance, d, was shortened so that the light receiving element 21 became located closer to the end surface 11 of the optical fiber.

As described above, when the plastic optical fiber is used, a common fiber diameter is from 0.5 mm to 2 mm. Among others, a fiber having a diameter of 1 mm is widely used from the viewpoint of easiness of use, i.e., easiness of connection and suppression of modal dispersion. On the other hand, the transmission rate of high speed communication generally used for the plastic optical fiber is from 100 Mbps to 622 Mbps, and the PD diameter suitable for that transmission rate is from 0.3 mm to 0.5 mm. The combination of the above fiber diameter and the above PD diameter almost coincides with the range in which the effect of the present invention can be produced most.

(Second Embodiment)

Figure 2:
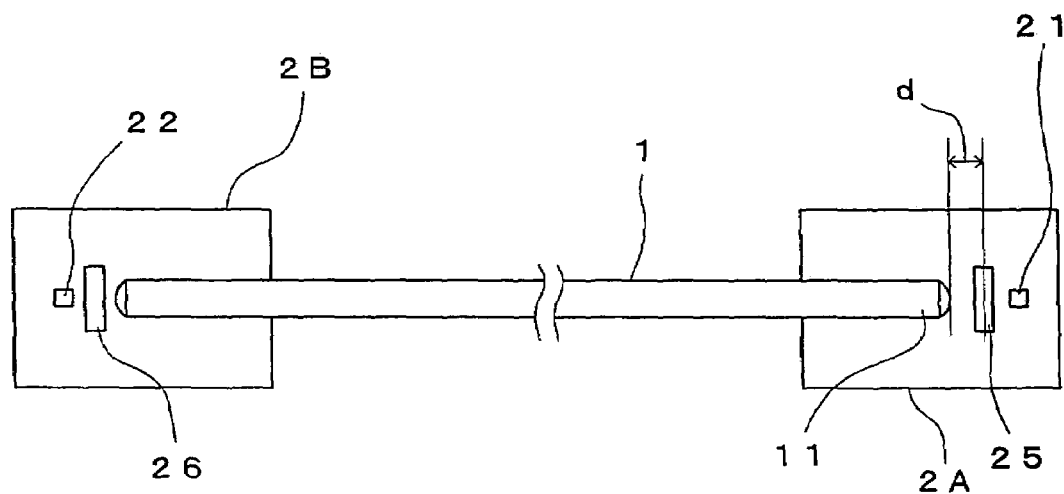
FIG. 2 is a view schematically showing the construction of an optical communication system according to one embodiment of the present invention.

FIG. 2 is a schematic view of a second embodiment of the optical communication system of the present invention. The second embodiment differs from the first embodiment in that the communication modules 2A and 2B are each provided with an optical system. In FIG. 2, constituent parts similar to the constituents shown in FIG. 1 are denoted by the same reference numerals as those shown in FIG. 1. In FIG. 2, reference numerals 25 and 26 denote a reception optical system and a transmission optical system, respectively. The reception optical system 25 is arranged between the light receiving element 21 and a spherical end surface 11 of the optical fiber 1 and operates to guide the outgoing radiant light from the spherical end surface 11 to the light receiving element 21. The transmission optical system 26 operates to guide light emitted from a light emitting element 22 to the other end surface of the optical fiber 1. The reception optical system 25 and transmission optical system 26 include a light refracting member, such as a prism, a lens or the like, which is formed of a substance of a refractive index different from that of air, and a light reflecting member such as a mirror or the like. In the present application, when a transparent molded piece (not shown) or the like of a refractive index different from that of air is formed on the light receiving element 21, even such a molded piece is treated as a constituent part of the reception optical system 25. The reception and transmission optical systems as described above are widely known to those skilled in the art, and therefore, no detailed description is herein provided therefor. It is acceptable to form a lens portion integrated with a transparent molded piece as the reception optical system 25.

The relational expressions (1) through (4) held between the light receiving element 21 and the spherical end surfaces 11 of the optical fiber 1 in the first embodiment hold between the reception optical system 25 and the spherical end surface 11 of the optical fiber 1 in the second embodiment. That is, in the first embodiment the distance from the apex of the spherical end surface 11 of the optical fiber 1 to the light receiving surface of the light receiving element 21 is defined as d by the expressions (1) through (4), while in the second embodiment the distance from the apex of the spherical end surface 11 of the optical fiber 1 to the center position of the reception optical system 25 is defined as d by the expressions (1) through (4). Moreover, although one of the expressions (1) through (4) is adopted in accordance with the numerical aperture (NA) of the radiant light emitted from the spherical end surface 11 of the optical fiber 1 and the diameter (PD diameter) of the light receiving element 21 in the first embodiment, the expressions (1) through (4) are applied in accordance with the size of the reception optical system 25 instead of the diameter of the light receiving element 21 in the second embodiment.

The "center position of the reception optical system 25" is a principal point of the reception optical system on the side of incidence of the principal ray of light from the optical fiber, as described above. Moreover, the "size of the reception optical system" is a diameter of a portion of the system that optically collect the light when the shape of the reception optical system is circular like a condenser lens, and is a typical dimension of a portion of the system that optically collect the light when the shape is not circular. For example, there is an oval mirror as the optical system that is not circular, and in this case, the average dimension of a section perpendicular to the optical axis at the principal point on the incident side of the oval mirror is used as the size of the optical system.

In the second embodiment as well, the effect of improvement in the reception efficiency similar to that of the first embodiment was obtained. Utilizing the present invention allows installment of a small-sized reception optical system by which the light is easily condensed on a small light receiving element.

(Third Embodiment)

Figure 20:
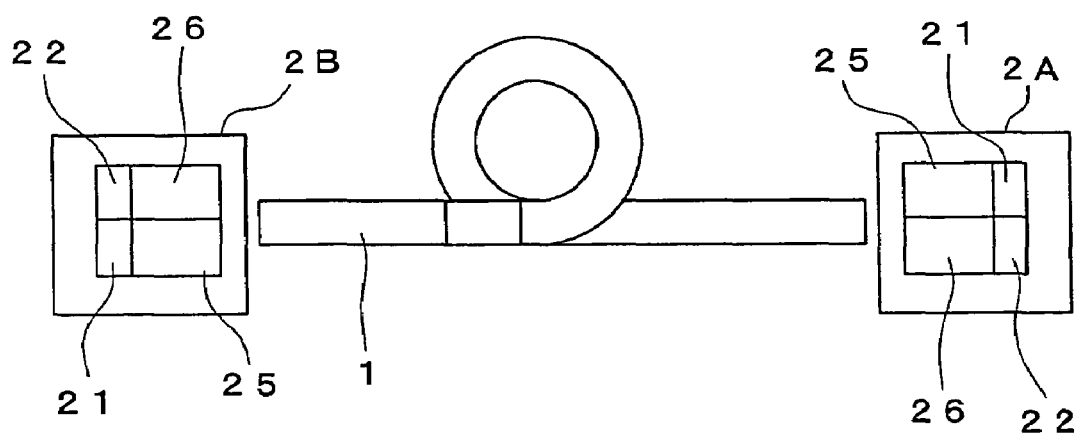
FIG. 20 is a view schematically showing the construction of an optical communication system employing the single-core two-way communication scheme according to one embodiment of the present invention.
Figure 21:
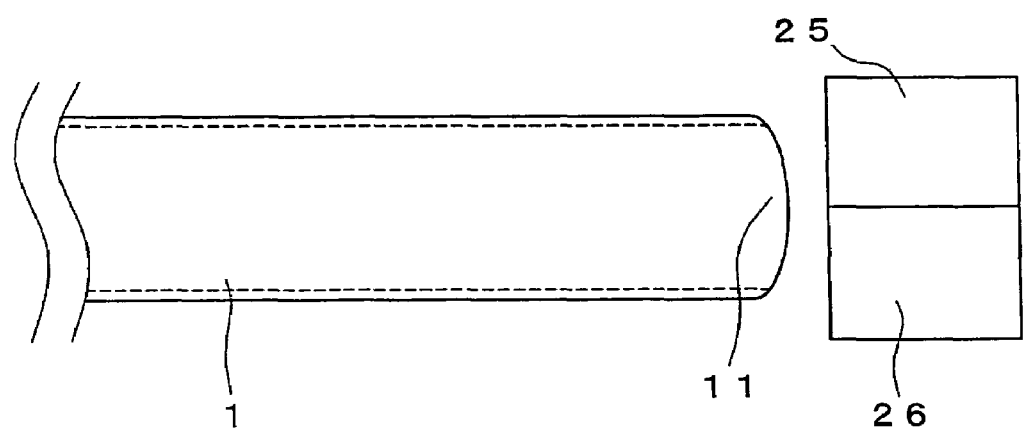
FIG. 21 is an enlarged schematic view showing part (neighborhood of the optical fiber end surface) of the optical communication system of FIG. 20.

FIG. 20 is a schematic structural view of the optical communication system that adopts a single-core two-way optical communication scheme according to a third embodiment of the present invention, and FIG. 21 is an enlarged view of part of FIG. 20. In FIG. 20, constituent elements similar to or same as the constituent elements shown in FIGS. 1 and 2 are denoted by the same reference numerals as those used in FIGS. 1 and 2, and no detailed description is provided therefor.

In contrast to the optical communication systems of the first and second embodiments in which the one-way communication scheme is adopted and the cooperating two optical communication modules 2A and 2B have either one of the light receiving element and the light emitting element, each of two optical communication modules 2A and 2B that constitute the communication system of the third embodiment together with the plastic optical fiber 1 has both the light emitting element 22 and the light receiving element 21 and operate as a transmitter-receiver module. Each of the optical communication modules 2A and 2B also has a transmission optical system 26 and a reception optical system 25. The light receiving and transmitting elements 21 and 22 and the light receiving and transmitting optical systems 25 and 26 are arranged so that the center position of the reception optical system 25 satisfies any one of the expressions (1) through (4) in accordance with the NA of the outgoing light from the optical fiber end surface 11 and the size of the reception optical system 25.

It is conceivable to make the light receiving and transmitting elements 21 and 22 directly face the optical fiber end surfaces 11 without using the optical systems 25 and 26. However, the occupation areas of the light receiving and transmitting elements 21 and 22 and retention portions therefor become considerably large with respect to the optical fiber end surface 11. Therefore, such an arrangement is possible but rather impractical when transmission and reception lights are separated from each other.

Figure 22:
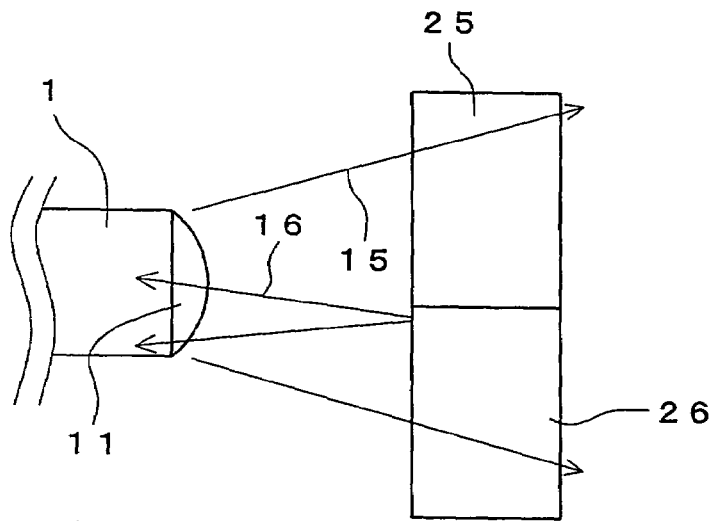
FIG. 22 is an explanatory view showing the relation between the dimension and position of the optical system in the optical communication system of the single-core two-way communication system and the coupling of the transmission/reception light with the optical fiber end surface/reception optical system.
Figure 23:
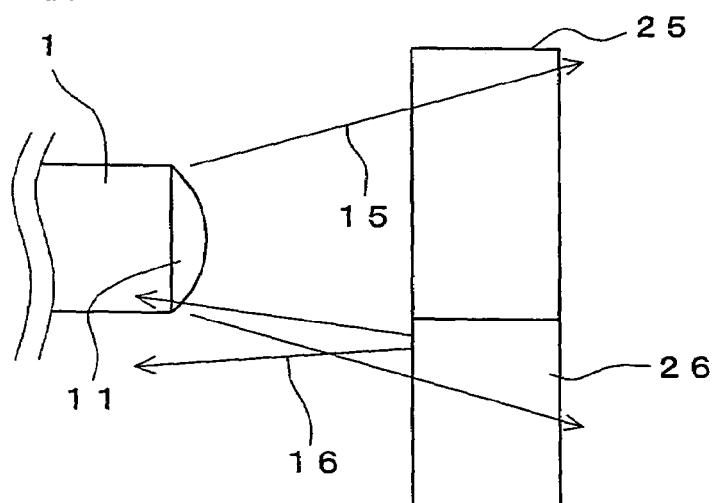
FIG. 23 is an explanatory view showing the relation between the dimension and position of the optical system in the optical communication system of the single-core two-way communication system and the coupling of the transmission/reception light with the optical fiber end surface/reception optical system.
Figure 24:
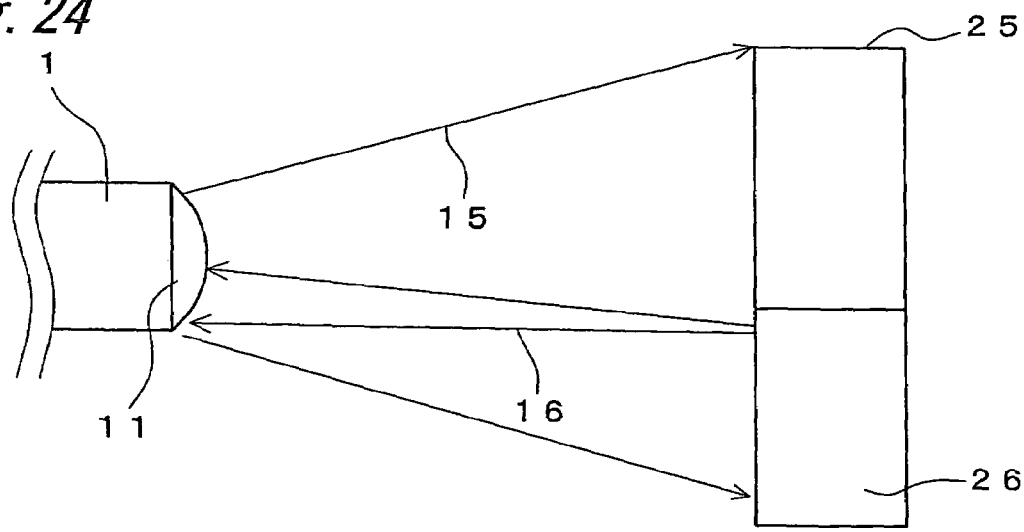
FIG. 24 is an explanatory view showing the relation between the dimension and position of the optical system in the optical communication system of the single-core two-way communication system and the coupling of the transmission/reception light with the optical fiber end surface/reception optical system.
Figure 25:
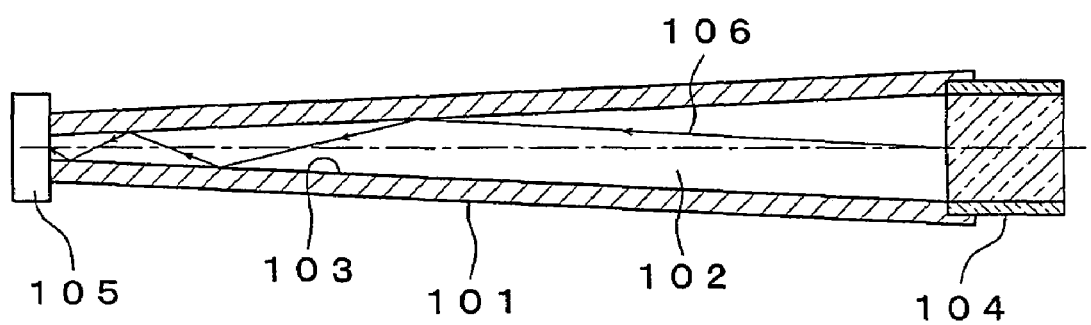
FIG. 25 is an explanatory view of prior art.
Figure 26:
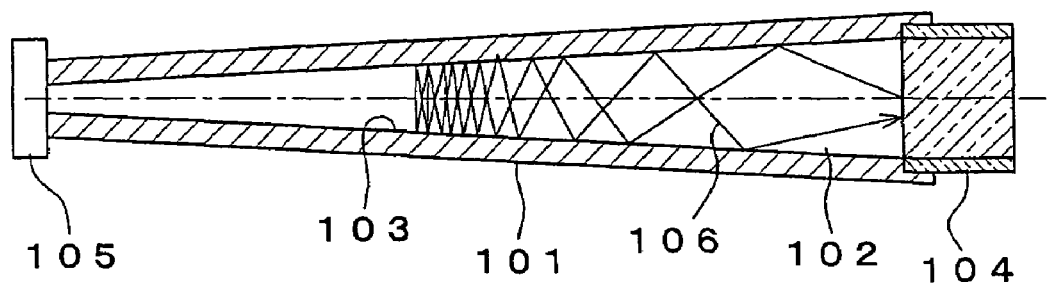
FIG. 26 is a view for explaining the problem of the prior art shown in FIG. 25.

Accordingly, when transmission and reception are carried out by one optical fiber, an optical system for changing the optical path to the light receiving element or to the light transmitting element is normally provided between the optical fiber end surface and the light receiving and transmitting elements in order to effectively separate the transmission and reception lights at the small optical fiber end surface. The light receiving and transmitting optical systems need to be small-sized in correspondence with the small optical fiber end surface. However, if the reception optical system is excessively small, then the loss of the reception light would be increased if no measure is taken. For example, as shown in FIG. 22, a half of the reception light 15 is disadvantageously rejected by the transmission optical system 26. If the reception optical system 25 is enlarged as shown in FIG. 23, then the transmission light 16 may not be coupled with the optical fiber end surface 11. As shown in FIG. 24, when the light transmitting and reception optical systems are arranged at a great distance from the optical fiber end surface 11, it is possible to carry out transmission and reception by using one optical fiber if the NA of the transmission light 16 is reduced even when a comparatively large reception optical system 25 is used. However, there would occur a problem that the reception light 15 is disadvantageously spread, making it difficult to achieve coupling to a small PD (light receiving element) 21 adaptable to high speed.

However, in the present embodiment, the reception optical system 25 is arranged in the position where any one of the expressions (1) through (4) is satisfied in accordance with the NA of the outgoing light from the optical fiber end surface 11 and the size of the reception optical system 25 as described in connection with the second embodiment. Therefore, although the rejection by the transmission optical system 26 cannot be helped, the reception optical system 25 efficiently receives light even if it has a small size, and is able to guide the received light 15 to the photodiode of the light receiving element 21.

The present invention has been described above on the basis of the three embodiments, and it is a matter of course that the constructions other than the features claimed in the claims, including the materials are not limited to those described in connection with the above embodiments and are allowed to be subjected to proper alterations and additions.

As is apparent from the above, according to the present invention, even if a plastic optical fiber having a large aperture is used as a transmission medium and a small-sized light receiving element capable of coping with high speed communication is used, an optically high coupling efficiency is obtained with a simple configuration. Particularly, when the diameter of the plastic optical fiber is 1 mm, which size is widely used, and the light receiving element is a small-sized photodiode that has a diameter of not larger than 0.5 mm and is able to cope with high speed, the reception efficiency can be effectively increased.

Moreover, the present invention allows the light receiving element and the reception optical system to have a reduced size. Therefore, when employing a single-core two-way optical communication method in which the two-way communication is carried out via one optical fiber, the present invention is effective from the viewpoint of the arrangement of the reception system parallel to the transmission system.

What is claimed is:

1. An optical communication system comprising:
an optical fiber having a spherical end surface at at least one end thereof, wherein radiant light emitted from the spherical end surface has a numerical aperture of not larger than 0.35; and
an optical communication module which has a light receiving element and receives the radiant light emitted from the spherical end surface of the optical fiber, wherein,
when the one end of the optical fiber is inserted in a prescribed portion inside the optical communication module, a light receiving surface of the light receiving element is located at a distance, d, from an apex of the spherical end surface of the optical fiber, and
assuming that a diameter of the optical fiber is D, a radius of curvature, R, of the spherical end surface is r*D, a refractive index of a core of the optical fiber is n, and a refractive index of a substance that exists between the spherical end surface of the optical fiber and the light receiving element is n1, then the distance, d, is:
within a range of $0<d\leq r*D/(n-n1)$ when a diameter of the light receiving element is not larger than D, and
within a range of $D\leq d\leq r*D/(n-n1)$ when the diameter of the light receiving element is larger than D.

2. An optical communication system comprising:
an optical fiber having a spherical end surface at at least one end thereof, wherein radiant light emitted from the spherical end surface has a numerical aperture of not larger than 0.35; and
an optical communication module which has a light receiving element and a reception optical system guiding the radiant light emitted from the spherical end surface of the optical fiber to the light receiving element, and receives the radiant light emitted from the spherical end surface of the optical fiber, wherein,
when the one end of the optical fiber is inserted in a prescribed portion inside the optical communication module, a center position of the reception optical system is located at a distance, d, from an apex of the spherical end surface of the optical fiber, and
assuming that a diameter of the optical fiber is D, a radius of curvature, R, of the spherical end surface is r*D, a refractive index of a core of the optical fiber is n, and a refractive index of a substance that exists between the spherical end surface of the optical fiber and the reception optical system is n1, then the distance, d, is:
within a range of $0<d\leq r*D/(n-n1)$ when a size of the reception optical system is not larger than D, and
within a range of $D\leq d\leq r*D/(n-n1)$ when the size of the reception optical system is larger than D.

3. An optical communication system comprising:
an optical fiber having a spherical end surface at at least one end thereof, wherein radiant light emitted from the spherical end surface has a numerical aperture of 0.4–0.6 inclusive; and
an optical communication module which has a light receiving element and receives the radiant light emitted from the spherical end surface of the optical fiber, wherein,
when the one end of the optical fiber is inserted in a prescribed portion inside the optical communication module, a light receiving surface of the light receiving element is located at a distance, d, from an apex of the spherical end surface of the optical fiber, and
assuming that a diameter of the optical fiber is D, then the distance, d, is:
within a range of $0<d<2D$ when a diameter of the light receiving element is not larger than D, and
within a range of $0.5D<d<2D$ when the diameter of the light receiving element is larger than D.

4. An optical communication system comprising:
an optical fiber having a spherical end surface at at least one end thereof, wherein radiant light emitted from the spherical end surface has a numerical aperture of 0.4–0.6 inclusive; and
an optical communication module which has a light receiving element and a reception optical system guiding the radiant light emitted from the spherical end surface of the optical fiber to the light receiving element, and receives the radiant light emitted from the spherical end surface of the optical fiber, wherein,
when the one end of the optical fiber is inserted in a prescribed portion inside the optical communication module, a center position of the reception optical system is located at a distance, d, from an apex of the spherical end surface of the optical fiber, and
assuming that a diameter of the optical fiber is D, then the distance, d, is:
within a range of $0<d<2D$ when a size of the reception optical system is not larger than D, and
within a range of $0.5D<d<2D$ when the size of the reception optical system is larger than D.

5. The optical communication system as claimed in claim 1, wherein
the optical fiber is a plastic optical fiber.

6. The optical communication system as claimed in claim 1, wherein
the substance is air whose refractive index n1 is one.

7. The optical communication system as claimed in claim 1, wherein
the diameter, D, of the optical fiber is 1 mm, and the light receiving element is a photodiode that has a diameter of not larger than 0.5 mm.

8. The optical communication system as claimed in claim 3, wherein
the diameter, D, of the optical fiber is 1 mm, and the reception optical system has a size of not larger than 0.5 mm.

9. The optical communication system as claimed in claim 1, wherein
the optical communication module further comprises, of a light emitting element and a transmission optical system, at least the light emitting element such that the optical communication module is able to transmit and receive a signal light via the optical fiber to and from a counterpart optical communication module in a single-core two-way communication scheme.

10. The optical communication system as claimed in claim 2, wherein the optical fiber is a plastic optical fiber.

11. The optical communication system as claimed in claim 2, wherein the substance is air whose refractive index n1 is one.

12. The optical communication system as claimed in claim 2, wherein
the diameter, D, of the optical fiber is 1 mm, and the light receiving element is a photodiode that has a diameter of not larger than 0.5 mm.

13. The optical communication system as claimed in claim 2, wherein
the optical communication module further comprises, of a light emitting element and a transmission optical system, at least the light emitting element such that the optical communication module is able to transmit and receive a signal light via the optical fiber to and from a counterpart optical communication module in a single-core two-way communication scheme.

14. The optical communication system as claimed in claim 3, wherein the optical fiber is a plastic optical fiber.

15. The optical communication system as claimed in claim 3, wherein
the diameter, D, of the optical fiber is 1 mm, and the light receiving element is a photodiode that has a diameter of not larger than 0.5 mm.

16. The optical communication system as claimed in claim 3, wherein
the optical communication module further comprises, of a light emitting element and a transmission optical system, at least the light emitting element such that the optical communication module is able to transmit and receive a signal light via the optical fiber to and from a counterpart optical communication module in a single-core two-way communication scheme.

17. The optical communication system as claimed in claim 4, wherein the optical fiber is a plastic optical fiber.

18. The optical communication system as claimed in claim 1, wherein
the diameter, D, of the optical fiber is 1 mm, and the light receiving element is a photodiode that has a diameter of not larger than 0.5 mm.

19. The optical communication system as claimed in claim 4, wherein
the diameter, D, of the optical fiber is 1 mm, and the reception optical system has a size of not larger than 0.5 mm.

20. The optical communication system as claimed in claim 4, wherein
the optical communication module further comprises, of a light emitting element and a transmission optical system, at least the light emitting element such that the optical communication module is able to transmit and receive a signal light via the optical fiber to and from a counterpart optical communication module in a single-core two-way communication scheme.

* * * * *